United States Patent [19]

Després et al.

[11] Patent Number: 4,601,373
[45] Date of Patent: Jul. 22, 1986

[54] CLUTCH WITH BUILT-IN TRAVEL LIMITING MEANS

[75] Inventors: Dominique Després, Clichy; Jacques Feigler, Pierrefitte, both of France

[73] Assignee: Valeo, Paris, France

[21] Appl. No.: 576,895

[22] Filed: Feb. 3, 1984

[30] Foreign Application Priority Data

Feb. 8, 1983 [FR] France ................... 8301935

[51] Int. Cl.⁴ .................. F16D 13/44; F16D 13/75
[52] U.S. Cl. .................. 192/70.18; 192/70.25; 192/70.28; 192/109 R; 192/111 A
[58] Field of Search ............ 192/70.18, 70.19, 70.25, 192/70.28, 109 R, 111 A; 74/531, 503

[56] References Cited

U.S. PATENT DOCUMENTS

| | | | |
|---|---|---|---|
| 1,648,524 | 11/1927 | Winning | 74/503 |
| 1,849,164 | 3/1932 | Wood | 192/70.19 |
| 3,086,634 | 10/1959 | Reed | 192/111 A |
| 3,360,089 | 12/1967 | Cockerill et al. | |
| 3,561,577 | 2/1971 | Binder . | |
| 3,602,340 | 8/1971 | Budzich | 74/531 |
| 3,797,622 | 3/1974 | Worner et al. . | |
| 4,207,972 | 6/1980 | Zeidler | 192/111 A |
| 4,362,230 | 12/1982 | Martinez Corral | 192/70.28 X |

FOREIGN PATENT DOCUMENTS

| | | |
|---|---|---|
| 951512 | 10/1949 | France . |
| 2382616 | 9/1978 | France . |
| 1179670 | 1/1970 | United Kingdom . |
| 1365613 | 9/1974 | United Kingdom . |

Primary Examiner—Martin P. Schwadron
Assistant Examiner—Stephen M. Hepperle
Attorney, Agent, or Firm—Charles E. Brown; Charles A. Brown

[57] ABSTRACT

In a clutch comprising at least one pressure plate with axially bored radial lugs at its periphery, a travel limiter is disposed in at least one of the axial bores. It comprises a rigid peg movable axially between two bearing surfaces in axial face-to-face relationship of the cover-reaction plate assembly. The peg is mounted with friction in a friction bush which is pressed against the peg by clamping members. The bush comprises axial retaining members for retaining it in position through the axial bore. The clamping members are adjusted so that the peg can slide in the bush when acted on by engagement means of the clutch, but not when acted on by disengagement means specific to the plate.

21 Claims, 6 Drawing Figures

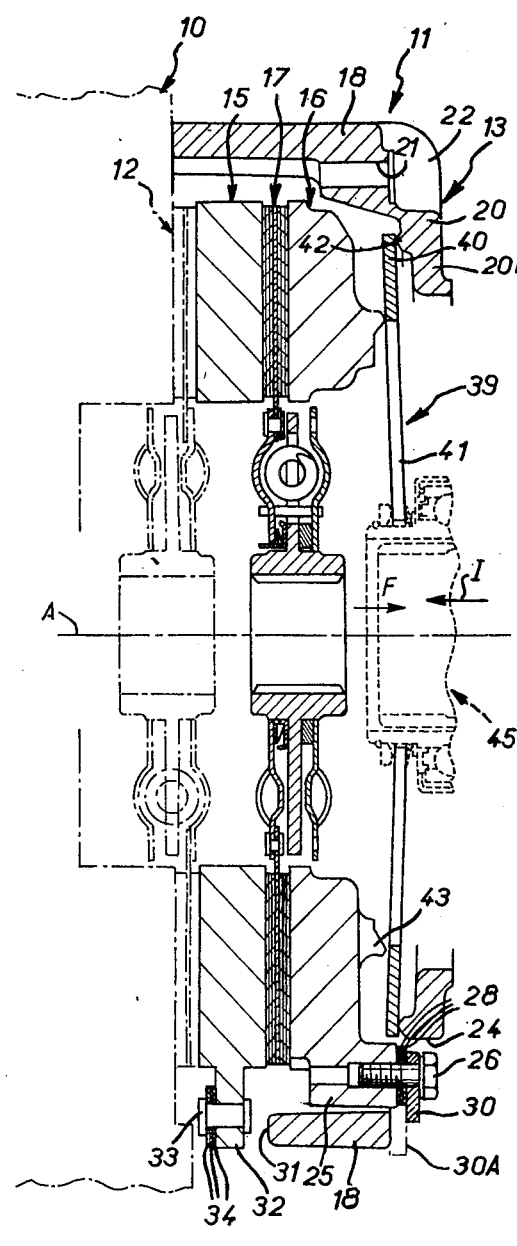
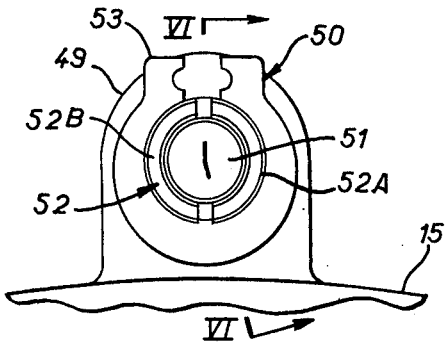
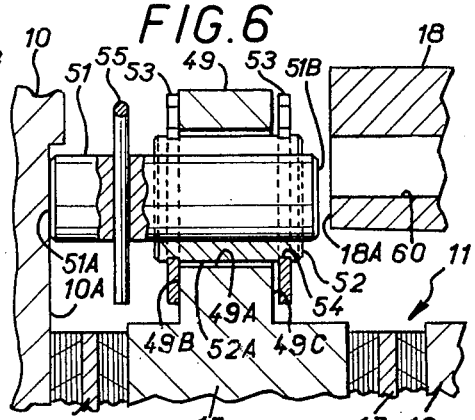
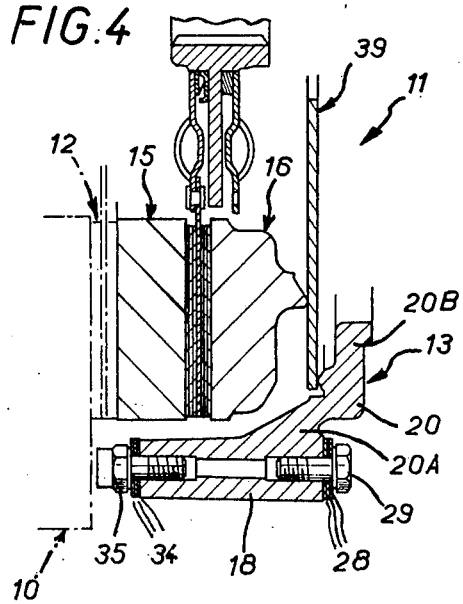

CLUTCH WITH BUILT-IN TRAVEL LIMITING MEANS

BACKGROUND OF THE INVENTION

1. Field of the invention

The present invention is generally concerned with clutches with built-in travel limiting means. It is more particularly, but not exclusively, directed to multiple disk clutches and especially dual or twin disk clutches comprising two friction disks for fitting to industrial vehicles.

2. Description of the prior art

As is known, a clutch comprises, axially distributed along a common rotation axis, a reaction plate, an end friction disk, at least in the case of a multiple disk clutch, a pair of members comprising in succession an intermediate pressure plate and an intermediate friction disk, an end pressure plate and an annular cover attached to the reaction plate. The plates and the cover are constrained to rotate with a driving shaft whereas the disk is or the disks are constrained to rotate with at least one driven shaft.

In the case of a twin disk clutch the pressure plates are jointly acted on by engagement means which urge them continually towards the reaction plate; on the other hand, they are individually acted on by disengagement means urging them continually towards the cover.

During disengagement of a clutch of this kind it can happen that an intermediate disk remains gripped between the two pressure plates which are adjacent it. This results from the return action of the individual disengagement means which confer on each pressure plate a significant range of axial movement, variable from one plate to another.

At present there are various known devices intended to overcome this disadvantage. The guiding principle in the case of a twin disk clutch, for example, is to allow the intermediate pressure plate a predetermined range of axial movement, adjustable in the axial direction to take into account the reduction in the thickness of the friction disks resulting from wear thereof. Thus French Pat. No. 951 512 proposes a device in which an intermediate (or external) pressure plate has on its external periphery radial lugs, bored in the axial direction, intended to have pass through them guide pins attached to the reaction plate. The axial movement of a plate of this kind is controlled by intermediate members in the form of sleeves clamped onto the pins and at the ends of which there are flanges for limiting the axial displacement of the plate in question. The intermediate members are clamped onto the pins in such a way that they can slide on the pins when acted on by the engagement members but not when acted on by the disengagement means.

A device of this kind has the disadvantage that it leads to the onset of jamming or friction between the intermediate members and the bores in the lugs on the intermediate plate. The result is a reduction in the torque transmission capacity of the clutch, or the choice of otherwise unnecessarily large dimensions for the engagement means. Also, controlling the force with which the intermediate members are clamped to the shafts is a delicate process. Because of this, in order to produce a reliable clutch, it is necessary to use a non-negligible clamping force so as to be certain that the intermediate member will not move when acted on by the disengagement means. Furthermore, a device of this kind is of unpredictable behavior because of expansion and corrosion phenomena which may affect it. Finally, the fitting of a clutch equipped with this device is a delicate and complex matter by virtue of the presence of the pins.

French Pat. No. 2 118 761 describes a device in which a finger retained in position by a clamping bush tightly fitted into a housing on the cover passes through each peripheral lug on a pressure plate.

Abutment rings are fixed in position on said finger in the axial direction by means of a spacer and said bush. In addition to the disadvantage memtioned above in relation to the previous patent, this device involves high machining costs by virtue of the complex shapes of the finger and the housing in the cover.

Unlike the previous two patents, French Pat. No. 1 576 120 describes a twin disk clutch in which fingers which are unrestrained with regard to the reaction plate and the cover pass through the bores in the lugs on the intermediate pressure plate. These fingers comprise a split elastic bush gripped in a bore in a lug and in which are disposed plugs linked to one another by a radially expandable pin. Axial movement of the intermediate pressure plate is then controlled by abutment of said plugs on respective axial bearing surfaces formed on the cover and on the reaction plate. A device of this kind presents the same problems as previously with regard to controlling the clamping force between the finger and the bore in the lug of the pressure plate which results, as has already been mentioned, in the choice of otherwise unnecessarily large dimensions for the engagement means.

An objective of the present invention is to overcome the aforementioned disadvantages, and the invention is more particularly directed towards providing for optimum transmission of torque to the clutch. The invention is also intended to provide a multiple or single disk clutch of which the behavior in operation is as independent as possible of the environment, in particular expansion and/or corrosion phenomena.

SUMMARY OF THE INVENTION

The invention consists in a clutch with built-in travel limiting means, comprising, axially distributed along a common rotation axis, a reaction plate, at least one pair of members conprising in succession a friction disk and a pressure plate, an annular cover adapted to be mounted on said reaction plate and forming therewith a cover-reaction plate assembly, engagement means adapted to urge said pressure plate continually towards said reaction plate, disengagement means adapted to urge said pressure plate continually towards said cover, at least one radial lug formed with an axial bore on the periphery of said pressure plate, a respective rigid peg adapted to serve as travel limiting means passing through said at least one axial bore and axially movable therein, two bearing surfaces on said cover-reaction plate assembly, in axial face-to-face relationship and constituting stop members between which said peg is axially movable, a friction bush within which said peg is adapted to slide with friction, at least one clamping member adapted to press said bush against said peg, and axial retaining members on said bush adapted to retain it in position through said axial bore, wherein said at least one clamping member is adjusted so that said peg can slide within said bush when acted on by said engagement means but not when acted on by said disengagement means, and wherein said plates and said cover are adapted to be constrained to rotate with a driving shaft and said disk is adapted to be constrained to rotate with a driven shaft.

A device in accordance with the invention provides for optimizing the transmission of torque to the clutch in that it provides a very precise means of controlling the friction between the peg and the bush. Thus the bush, being separate from the pressure plate, may be of a non-metal insulative friction material; it is therefore substantially isolated from the thermal point of view and variations in its internal temperature are extremely limited. Thus the coefficient of friction between the bush and the peg remains substantially constant. Furthermore, since the peg is not attached either to the cover or to the reaction plate, there is no risk of friction or jamming. Finally, the fact that said clamping member is separate from the bush, the peg, the cover and the reaction plate means that it can be easily calibrated and thus the resulting friction between the bush and the peg controlled with precision. The high degree of control over the friction between the bush and the peg achieved in this way makes it possible to reduce, without any loss of reliability, the positive differential between the axial force threshold corresponding to the onset of sliding between the peg and the bush and the force likely to be applied by the disengagement means.

In a preferred embodiment of the invention the peg comprises a transverse shoulder adapted to abut on the surface of the pressure plate which faces the reaction plate. This arrangement offers particular advantage on fitting the clutch and on replacing the friction disks. Specifically, the peg may be a profiled section through which passes diametrically a pin forming the transverse shoulder. A configuration of this kind results in extremely low manufacturing costs.

In another preferred embodiment of the invention there are at least two members for clamping the bush around the peg and these and the axial retaining members for retaining said bush in position through the axial bore in the lug of the pressure plate are one and the same. The clamping members may be circlips, for example. This results in low manufacturing costs in respect of the bush.

Also in accordance with the invention, the bush together with its clamping and/or retaining members may be disposed with axial and/or transverse play in the bore through the lug on the pressure plate. This makes it extremely easy to fit the bush into said lug and also minimizes thermal exchange between the bush-peg combination and the pressure plate.

In view of the need to control the forces which may be applied to the peg, the invention also provides for various arrangements intended to eliminate any alteration of the elastic properties of the disengagement means during the fitting or removal of the clutch, especially in the case of a twin disk clutch. Thus axial bores are provided in the cover in line with each peg, through each of which a pin passes in the direction towards the reaction plate; likewise the pressure plate is provided with protruberances which extend radially through the cover and whereby—following the axial insertion of removable chocks between said protruberances and axially oriented bearing surfaces on the cover opposite the reaction plate—said protruberances are adapted to retain said pressure plate, against the action of said engagement means, in a storage configuration in which the elastic disengagement means are not loaded.

Other objects and advantages will appear from the following description of an example of the invention, when considered in connection with the accompanying drawings, and the novel features will be particularly pointed out in the appended claims.

BRIEF DESCRIPTION OF THE DRAWINGS

FIG. 3 is a view of it in axial cross-section on the broken line III—III in FIG. 1.

FIG. 4 is another view of it in partial axial cross-section on the line IV—IV in FIG. 1.

FIG. 5 shows to a larger scale and in vertical orientation the constructional detail indicated by the box V on FIG. 1.

FIG. 6 is a partial cross-section on the line VI—VI in FIG. 5, to the same scale as FIG. 5.

DESCRIPTION OF THE PREFERRED EMBODIMENT

Figure 1:
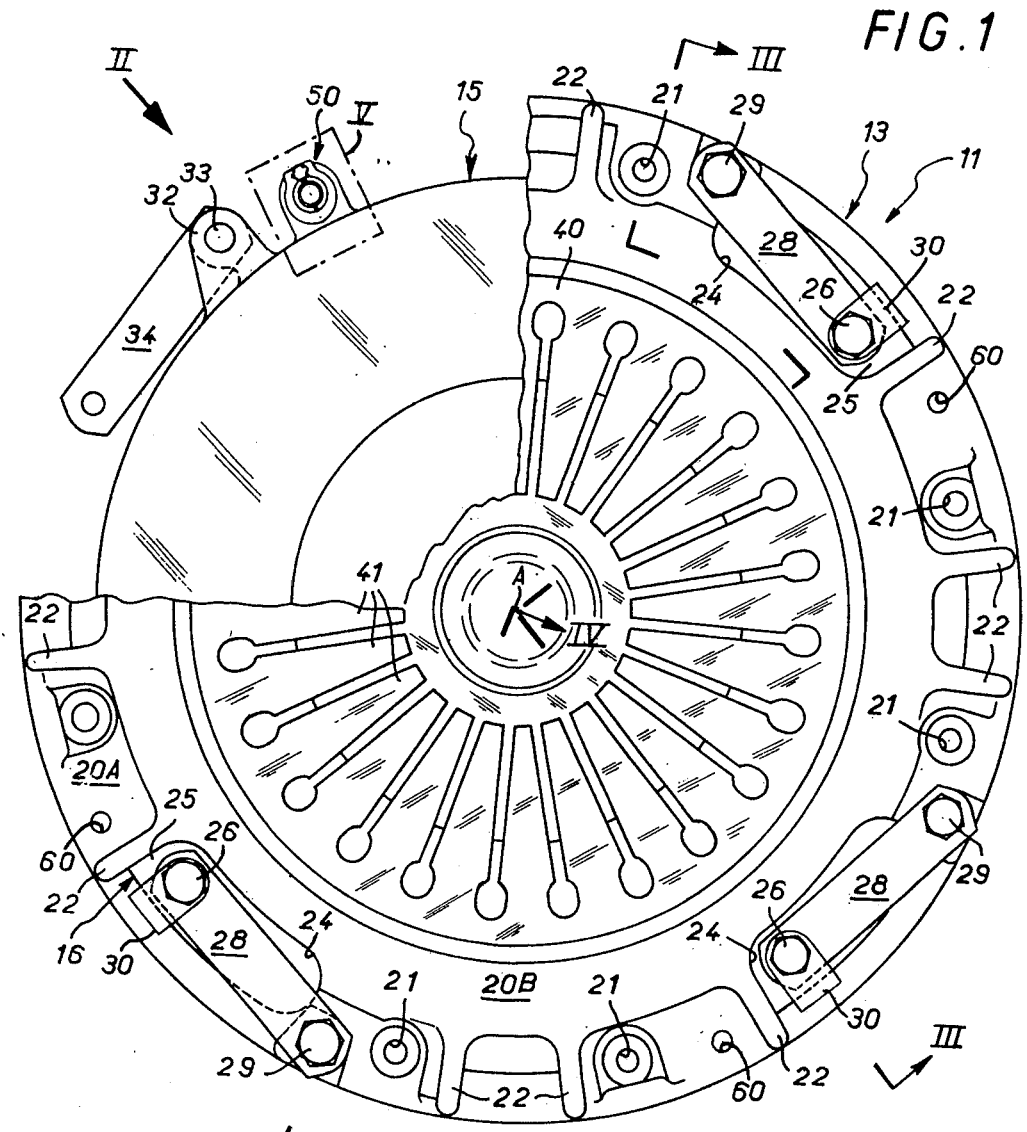
FIG. 1 is a view in elevation of a clutch in accordance with the invention, seen in the direction of the arrow I in FIG. 3 and partially cut away in the top lefthand quadrant.

FIGS. 1 to 6 show, by way of example, the application of the invention to a twin disk clutch.

In a manner known in itself, a twin disk clutch of this kind generally comprises a plate 10, commonly referred to as the reaction plate or flywheel, and a clutch cover assembly 11, appropriately attached by screws to the plate 10, with inserted between them a friction disk 12 referred to hereinafter for convenience as the end friction disk.

The reaction plate 10 is shown only in part and schematically in the figures. It is usually constrained to rotate with a first shaft, in general a driving shaft and the motor output shaft in the case of a automotive vehicle, for example. As this reaction plate 10 does not in itself constitute part of the present invention, it will not be described in detail here.

The clutch cover assembly 11 generally comprises, in a manner known in itself, an annular member 13 called the cover which forms a casing. Within the volume defined by the cover there are disposed, axially spread out towards the back of the cover, a first annular plate 15, referred to hereinafter for convenience as the intermediate pressure plate, and a second annular plate 16, referred to hereinafter for convenience as the end pressure plate, there being between them a friction disk 17 referred to hereinafter for convenience as the intermediate friction disk.

The cover 13 generally comprises an axial lateral wall 18, cylindrical in the embodiment shown, and, at the axial end of the lateral wall 18 farthest from the reaction plate 10, a transverse flange 20 extending radially towards the axis A of the assembly. It is by means of this cover 13 that the clutch cover assembly 11 is adapted to be mounted on the reaction plate 10, by means of screws (not shown in the figures) fitted through axial openings 21 formed at intervals through the flange 20 of said cover 13.

In the embodiment shown in the figures, the radial flange 20 of the cover 11 comprises, radially staggered and offset relative to one another in the axial direction, two sections 20A and 20B. The openings 21 provided for fitting the screws are formed in the outermost section 20A of the radial flange 20. The sections 20A and 20B are linked at intervals by radial stiffener ribs 22.

The end pressure plate 16 is constrained to rotate with the cover 13, whilst being able to move axially relative thereto, by means of elastically deformable tangs 28 constituting disengagement means. These tangs 28 are attached by screws 26 to axial bosses 25 on the end pressure plate, in line with openings 24 formed in the radially outermost section 20A of the flange 20 of the cover 13. The elastically deformable tangs 28 are grouped in fours in the embodiment shown, and extend substantially tangentially to a circumference of the assembly; at their ends they are attached by screws 29 to the cover, more precisely to the radially outermost section 20A of the flange 20 of said cover, in line with the lateral wall of the latter.

In the embodiment shown by way of example, each screw 26 is associated with a chock carrier 30 inserted between the head of the screw 26 and the corresponding elastically deformable tangs 28, which extend generally radially. The function of a chock carrier of this kind will emerge hereinafter.

The intermediate pressure plate 15 is also constrained to rotate with the cover 13, whilst being movable in the axial direction, by elastically deformable tangs 34, also constituting disengagement means. These tangs are grouped in fours in the embodiment shown and, like the tangs 28, extend substantially tangentially to a circumference of the assembly. On the one hand, they are attached to lugs 32 on the intermediate pressure plate, projecting radially through the cover 18 by means of openings 31 in the lateral wall of the latter, while, on the other hand, they are attached at their other end by screws 35 to the cover 13, more precisely to the edge of said lateral wall 18 of the latter.

Figure 2:
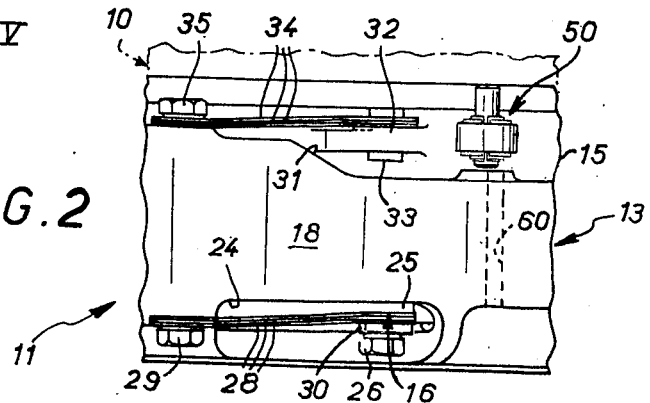
FIG. 2 is a partial side view of it, seen in the direction of the arrow II in FIG. 1.

As can be seen in FIGS. 2 and 4, the screws 35 are in line with the corresponding screws 29 attaching the aforementioned elastically deformable tangs 28 to the cover 13. As a result, the corresponding axial bores are axially continuous, which can facilitate the fabrication and machining of the cover 13.

The friction disks 12 and 17 do not of themselves form part of the present invention and will not be described in detail here. These friction disks are constrained, generally by means of their hub, to rotate with a common shaft, in practice a driven shaft, the gearbox input shaft in the case of an automotive vehicle, for example.

The pressure plates 15 and 16, individually acted on by the disengagement means formed by the tangs 28 and 34, are jointly acted on by elastic engagement means urging them continually in the direction away from the cover 13, bearing on the latter.

In the embodiment shown these elastic engagement means comprise an annular member 39, commonly referred to as a diaphragm spring, having a peripheral part forming a Belleville washer 40 and a central part divided into radial fingers 41. The diaphragm spring 39 bears on the radial flange 20 of the cover 13 through an annular axial bead 42, which may be subdivided circumferentially, on the radially innermost section 20B of said flange. The diaphragm spring also bears on the end pressure plate 16, through the intermediary of an annular axial bead 43 on said pressure plate and in practice subdivided circumferentially. At the ends of its radial fingers 41 the diaphragm spring 39 is adapted to be acted on by a control member 45, or clutch release bearing, which is shown only in part and schematically in FIG. 3.

In the embodiment shown, this clutch release bearing 45 is adapted to act in traction, that is to say in the direction away from the reaction plate, as shown by the arrow F in FIG. 3. Consequently, the diameter of the circumference along which the bead 42 on the cover extends is greater than that of the circumference associated with the bead 43 on the end pressure plate 16.

The return tangs 28 and 34 individually apply to each of the plates 15 and 16 a return force which depends on the degree to which they are bent. Naturally this return force, in the direction of the arrow F in FIG. 3, is very much less than the force developed in the opposite direction by the diaphragm spring 39. These arrangements, well known in themselves, will not be discussed in more detail here.

In a manner known in itself, the intermediate pressure plate 15, located between the two friction disks 12 and 17, is provided with axial travel limiting means through radial peripheral lugs 49.

In accordance with the invention, and as shown by way of example in FIGS. 5 and 6, a travel limiting device 50 of this kind comprises a peg 51 fitted tightly into a bush 52.

The peg 51 is rigid and consists, for example, of a profiled section, this enabling its fabrication cost to be significantly reduced. In this example shown the peg is of cylindrical shape. Mounted parallel to the rotation axis of the clutch cover assembly, the peg 51 has at its end two transverse surfaces 51A and 51B respectively adapted to abut on an axial bearing surface 10A on the reaction plate and on an axial bearing surface 18A on the lateral wall 18 of the cover 13.

The radial peripheral lugs 49 on the intermediate pressure plate 15 pass at least partially through the lateral wall 18 of the cover 13. As can be seen in FIG. 2, the lugs 49 pass through the lateral wall 18 by means of the same openings 31 as the lugs 32 on the pressure plate 15 designed to provide the linkage with the cover through the intermediary of the tangs 34.

The friction bush 52 in which the peg 51 is a friction fit is formed in one or more parts, two in the example shown, pressed against the peg by at least one clamping member 53. In the example under consideration, there are two of these, disposed one on each side of the lug 49. Note that in the example shown these clamping members also retain the bush in position in the axial direction in the axial bore 49A in the lug 49 on the intermediate pressure plate 15.

In the embodiment shown in FIGS. 5 and 6, the clamping and axial retaining means consist of circlips engaged in circular grooves 54 on the two parts 52A and 52B of the friction bush 52.

As can be seen from FIG. 6, the travel limiting device in accordance with the invention is tolerant of radial or transverse play between the bore in the lugs 49 on the pressure plate and the external surface 52A of the bush 52, and also to axial play between the transverse surfaces 49B and 49C of the lugs and the clamping members 53. As a result, the bush and the peg are relatively well insulated thermally from the intermediate pressure plate 15, which is likely to be subjected to significant temperature variations in operation. They are also easy to fit. The peg 51 also has, in the vicinity of its surface 51A which bears against the bearing surface 10A on the reaction plate 18, a transverse shoulder 55 which in the example shown consists of a pin. As an alternative, the shoulder may result from an increase in the diameter of the peg.

Such an arrangement of the various parts of a travel limiter in accordance with the invention results in very low manufacturing costs and extremely easy fitting through the lugs 49 on the intermediate pressure plate 15. The sections of cylindrical bar forming the peg and the sections of tube forming the bush, the pins 55 and the circlips 53 are readily available and therefore extremely inexpensive. Furthermore, the relatively loose tolerance in respect of the play between the bush 52 equipped with its clamping and axial retaining means 53 and the bore in the lugs 49 substantially facilitates the insertion of said bush through the bore and the subsequent fitting of the clamping means 53.

As shown in FIGS. 1, 2 and 6 axial bores 60 or channels are formed through the lateral wall 18 of the cover 13, at least partially in line with the pegs 51.

The function of the aforementioned pins 55 and axial bores 60 will emerge hereinafter, in connection with the operations involved in fitting the clutch or changing the friction disks.

The clamping members 53 are adjusted so that the peg can slide in the bush when acted on by the engagement means 39 but not when acted on by the disengagement means 34 and 28. As a result, on retraction of the control member 45 or clutch release bearing in the direction of the arrow F, corresponding to disengagement of the clutch, which enables the pressure plates 15 and 16 to move back towards the cover under the action of their individual return means 34 and 28, the axial travel of the intermediate pressure plate is limited by abutment of the peg against the lateral wall 18 of the cover 13 through the respective bearing surfaces 51B and 18A. On movement of the control member 45 towards the reaction plate 10, permitting return of the clutch to the engaged configuration, the combination of the plates 15 and 16 gripping the friction disks 12 and 17 is pressed towards the reaction plate 10, ensuring proper rotational coupling of the driving and driven shafts. Adjustment of the axial travel of the intermediate pressure plate 15 towards the reaction plate 10, rendered necessary in particular by wear of the facings of the end friction disk 12, is achieved by sliding the bush 52 relative to the peg 51 after the transverse surface 51A of the latter has come into abutment with the reaction plate 10. It may be verified that on disengagement of the clutch the axial travel of the intermediate pressure plate 15 towards the cover 13 is equal to the sum of the axial clearances between, on the one hand, the respective surfaces 51B and 18A of the peg 51 and the lateral wall 18 of the cover 13 in the configuration of FIG. 6 and, on the other hand, the axial clearance between the lug 49 on the intermediate pressure plate 15 and the clamping and axial retaining means 53. This axial return travel of the plate 15 towards the cover is maintained at a value such that on disengagement of the clutch the intermediate pressure plate 15 moves back towards said cover to a lesser extent than the end pressure plate 16. As a result, any risk of the intermediate friction disk 17 being gripped between the pressure plates 15 and 16 is eliminated.

A travel limiting device in accordance with the invention is adapted to facilitate the operations involved in recentering the intermediate friction disk 17 and replacing this disk, in combination with the channels 60 and the chock carriers 30.

In practice, the operations involved in changing the intermediate friction disk 17 are carried out as follows. First of all, the clutch is placed in the release configuration so as to bring the end pressure plate 16 as close as possible to the flange 20 on the cover 13. Chocks 30A shown in dashed line in FIG. 3 are then inserted axially between the chock carriers 30 and the portions facing them of the outermost section 20A of the cover 13. The screws retaining the cover 13 to the reaction plate 10 may then be unscrewed without risk of distension through buckling of the tangs 28 and 34, since expansion of the diaphragm spring 39 is limited by the chocks. The disk 12 is removed by separating the clutch cover assembly 11 from the plate 10. The screws 35 attaching the tangs 34 to the cover 13 (see top lefthand corner of FIG. 1) are then unscrewed so that it is possible to remove the intermediate pressure plate 15 and obtain access to the intermediate friction disk 17.

After replacement of the latter, the tangs 34 are reattached to the cover 13 with the screws 35 after bringing the transverse shoulder 55 into abutment with the edge of the bush 52. While the screws are being replaced the intermediate pressure plate 17 is immobilized in the axial direction relative to the cover since the surface 51B of the peg is in abutting relationship with the corresponding bearing surface 18A and the bush cannot move relative to the peg under the force applied to it by the disengagement means. The position of the shoulder 55 on the peg is such that the tangs are elastically loaded, without being distended beyond their elastic limit. In this position, the plate 15 is not close to the end pressure plate 16 and the friction disk 17 between them is free to be recentered by any appropriate means. The clutch is then fitted by attaching the clutch cover assembly 11 to the reaction plate 10 after interposing an end friction disk 12, generally a new disk. During this operation the pressure plate 15 is slightly pushed back towards the cover by the disk 12 which is pressed between it and the reaction plate 10, whereas the removable chocks 30A are progressively released and then either drop out or are removed. All that is then required to return the clutch to a serviceable configuration is, by means of a pin passed through the bores 60, to bring the various pegs into abutting relationship with the reaction plate. These bores 60 are of smaller diameter than the pegs 51 (when the latter are solid) and/or offset relative to the latter, so as not to interfere with the abutting relationship between the bearing surfaces 51B and 18A.

Note that the use of the chocks 30A and the chock carriers 30 enables the clutch cover assembly 11 to be attached to the reaction plate 10 with screws which are much shorter than in the prior art since, in accordance with the invention, there is no need to compensate by screwing action the elastic expansion of the diaphragm spring 39, since the latter is maintained compressed.

Consequently, the invention makes it easy to fit the travel limiter through the lugs 49 on the intermediate pressure plate 15 and to fit the clutch cover assembly to the reaction plate 10. Transmission of torque to the clutch is optimized, and the operations involved in recentering the intermediate disk are greatly facilitated.

There will generally be selected for the peg and the bush materials such that the coefficient of friction between them is largely independent of the operating conditions. It is also recommended that the peg be of a corrosion-resistant material (stainless steel, for example) so as to eliminate all risk of corrosion, and that the friction bush be of a non-metal friction material, preferably an insulator. In the case of the bush, this eliminates all risk of corrosion through contact or friction (sometimes referred to as "fretting corrosion") and also provides for reducing temperature variations at the surface of the peg. Because of this, and also by virtue of its being fitted with clearance, a travel limiting device in accordance with the invention is relatively insensitive to the environment, and in particular to temperature and humidity.

It will be understood that various changes in the details, materials and arrangements of parts, which have been herein described and illustrated in order to explain the nature of the invention, may be made by those skilled in the art within the principle and scope of the invention as expressed in the appended claims.

For example, the invention is applicable to all clutches, whether they comprise one or more friction disks. Travel limiters of the aforementioned type may be provided in any number and distributed in any way between the various pressure plates, the bearing surfaces for the peg being formed within the cover-reaction plate assembly and the radial openings in the wall 18 of the cover 13 not necessarily being the same as the openings provided for fitting the return tangs 34; also, the latter may be replaced by any other form of disengagement means.

Note also that the axial retaining function and the function of clamping the bush around the peg implemented simultaneously by the circlips 53 in the preferred embodiment may, where appropriate, be implemented by separate members.

A second transverse shoulder may also be provided on the peg 51, this time on the same side as the cover, to prevent the peg escaping from the bush.

Further, the peg, which is solid in the embodiment described, may be hollow and the bush may be in one part. For example, it may be split along its entire length or provided, at least in line with the clamping members, with slots defining between them tangs confering local elasticity on it such that its stiffness is low in comparison with the stiffness of the clamping means, for proper control of the clamping force.

One of the retaining members may consist of a flange on the bush, especially where the latter is in one piece, forming a shoulder in the vicinity of one of the transverse surfaces of the lug, whereas the other retaining member, in the vicinity of the other transverse surface of the lug, is formed by the clamping member, a single clamping member sufficing in this case. Nevertheless, for reasons of symmetry another circlip may be provided beyond the flange.

It will be understood that for better adjustment of the clamping force it would be possible to provide more than two circlips, for example one circlip on one of the transverse surfaces of the lug and two circlips on the other transverse surface of the lug, the latter being accommodated side by side in a common groove.

Note that although in the embodiment described the retaining members are located on both sides of the lug, they could be axially staggered on one side only of the lug, a hook or other means attached to or integral with the lug being provided to cooperate in abutting relationship with one of the retaining members, the other retaining member being adapted to cooperate with the transverse surface of the lug.

Finally, it should be noted that although it has been described in relation to an intermediate pressure plate, the invention is also applicable to the pressure plate closest the back of the cover in that it provides for limiting the travel of said plate, and thus of the disk juxtaposed to it, and is thus conducive to the avoidance of any interference between the hub of said disk and the fingers of the diaphragm spring on maneouvering the clutch. In this sense, the invention is seen to relate to all clutches, whether single disk or multiple disk types.

We claim:

1. A clutch with built-in travel limiting means, comprising, axially distributed along a common rotation axis, a reaction plate, at least one pair of members comprising in succession a friction disk and a pressure plate, an annular cover adapted to be mounted on said reaction plate and forming therewith a cover-reaction plate assembly, engagement means adapted to urge said pressure plate continually towards said reaction plate, disengagement means adapted to urge said pressure plate continually towards said cover, at least one radial lug formed with an axial bore on the periphery of said pressure plate, a respective rigid peg adapted to serve as travel limiting means passing through said at least one axial bore and axially movable therein, two bearing surfaces on said cover-reaction plate assembly, in axial face-to-face relationship and constituting stop members between which said peg is axially movable, a friction bush within which said peg is adapted to slide with friction, at least one clamping member adapted to press said bush against said peg, said bush being axially moveable within said bore and axial retaining members on said bush adapted to retain it extending through said axial bore, wherein said at least one clamping member separate from said bush is selected so that said peg can slide within said bush when a force of preselected valve is applied to said pin in either direction, said force value being one wherein said peg will slide within said bush when acted on by said engagement means but will not slide when acted on by said disengagement means the force applied by said engagement means being greater than said force value and the force applied by said disengagement means being less than said force value, and wherein said plates and said cover are adapted to be constrained to rotate with a driving shaft and said disk is adapted to be constrained to rotate with a driven shaft.

2. A clutch according to claim 1, wherein at least one of said clamping members and at least one of said axial retaining members are one and the same.

3. A clutch according to claim 2, wherein said at least one clamping member is a circlip.

4. A clutch according to claim 1, wherein said bush and said peg are fabricated from respective materials such that the coefficient of friction between them is substantially insensitive to environmental conditions, in particular temperature and humidity.

5. A clutch according to claim 4, wherein said peg is fabricated from a corrosion-resistant material.

6. A clutch according to claim 1, wherein said bush is fabricated from a non-metal insulative material.

7. A clutch according to claim 6, wherein said bush is fabricated in two parts adapted to be pressed against said peg by said clamping members.

8. A clutch according to claim 1, wherein said bush is disposed in said axial bore in said lug with transverse play.

9. A clutch according to claim 1, wherein said bush is disposed in said axial bore in said lug with axial play.

10. A clutch according to claim 1, wherein said retaining members are disposed on both sides of said lug.

11. A clutch according to claim 1, wherein there is a plurality of said clamping members, disposed on both sides of said lug.

12. A clutch according to claim 10, wherein one of said retaining members is a shoulder on said bush.

13. A clutch according to claim 1, wherein said clamping member(s) and said retaining members are one and the same and are disposed on both sides of said lug.

14. A clutch according to claim 1, further comprising a plurality of said disengagement means, the number of said disengagement means being the same as the number of said lugs.

15. A clutch according to claim 1, wherein said peg comprises a transverse shoulder adapted to abut against the surface of said pressure plate facing said reaction plate.

16. A clutch according to claim 1, further comprising a pin and an axial bore in said cover facing said peg and adapted to permit said pin to pass through it towards said reaction plate, the arrangement being such that it is impossible for said peg to enter said axial bore.

17. A clutch according to claim 16, wherein said axial bore in said cover is offset from said axial bores in said lugs.

18. A clutch according to claim 1, comprising a plurality of cover-pressure plate assemblies and wherein a said pressure plate nearest said cover has protruberances adapted to extend radially through said cover and said cover has an axially oriented bearing surface opposite said reaction plate, whereby—following the axial insertion of removable chocks between said protruberances and said bearing surfaces—said protruberances are adapted to retain said pressure plate, against the action of said engagement means, in a storage configuration when said cover-pressure plate assembly is removed from said reaction plate.

19. A clutch according to claim 18, wherein said disengagement means comprise circumferentially acting elastic tangs, and further comprising chock carriers which constitute said protruberances and coupling members which attach said chock carriers to said plate and said tangs to said pressure plate.

20. A multiple disk clutch, comprising, axially distributed along a common rotation axis, a reaction plate, an end friction disk, a clutch cover assembly comprising at least one pair of members comprising in succession an intermediate pressure plate and an intermediate friction disk, an end pressure plate, an annular cover adapted to be mounted on said reaction plate and forming therewith a cover-reaction plate assembly, engagement means adapted to urge said pressure plates continually towards said reaction plate, disengagement means adapted to urge said pressure plates individually and continually towards said cover, at least one radial lug formed with an axial bore on the periphery of at least said intermediate pressure plate adjacent said end friction disk, a respective rigid peg adapted to serve as travel limiting means passing through said at least one axial bore and axially movable therein, two bearing surfaces on said cover-reaction plate assembly in axial face-to-face relationship and constituting stop members between which said peg is axially movable, a friction bush within which said peg is adapted to slide with friction, at least one clamping member adapted to press said bush against said peg, said bush being axially moveable within said bore and axial retaining members on said bush adapted to retain it extending through said axial bore, wherein said clamping member separate from said bush is selected so that said peg can slide within said bush when a force of preselected valve is applied to said pin in either direction, said force value being one wherein said peg will slide within said bush when acted on by said engagement means but will not slide when acted on by said disengagement means the force applied by said engagement means being greater than said force value and the force applied by said disengagement means being less than said force value, and wherein said plates and said cover are adapted to be constrained to rotate with a driving shaft and said disk is adapted to be constrained to rotate with a driven shaft.

21. A clutch cover assembly with built-in travel limiting means and adapted to be mounted on a reaction plate, comprising a hollow annular cover adapted to be mounted on said reaction plate, at least one friction disk, at least one pressure plate within said cover and adapted to urge said at least one friction disk towards said reaction plate, engagement means adapted to urge said pressure plate continually towards said reaction plate, disengagement means adapted to urge said pressure plate continually towards said cover, means adapted to constrain said pressure plate to rotate with said cover whilst permitting relative axial movement therebetween, at least one radial lug formed with an axial bore on the periphery of said pressure plate, a respective rigid peg passing through said at least one axial bore and axially movable therein, a friction bush within which said peg is adapted to slide with friction, at least one clamping member adapted to press said bush against said peg, said bush being axially movable within said bore axial retaining members on said bush adapted to retain it extending through said axial bore, wherein said clamping member separate from said bush is selected so that said peg can slide within said bush when a force of preselected valve is applied to said pin in either direction, said force value being one wherein said peg will slide within said bush when acted on by said engagement means but will not slide when acted on by said disengagement means the force applied by said engagement means being greater than said force value and the force applied by said disengagement means being less than said force value.

* * * * *